United States Patent [19]
Gray

[11] 3,718,032
[45] Feb. 27, 1973

[54] ULTRASONIC VISUALIZATION

[75] Inventor: George William Gray, Lambertville, N.J.

[73] Assignee: Hoffman-La Roche Inc., Nutley, N.J.

[22] Filed: Sept. 18, 1970

[21] Appl. No.: 73,521

[52] U.S. Cl. .................................73/67.7, 340/5 MP
[51] Int. Cl. ..............................................G01n 29/04
[58] Field of Search....178/DIG. 18; 73/67.5 R, 67.6, 73/67.7, 67.8 S; 340/5 I

[56] References Cited

UNITED STATES PATENTS

| | | | |
|---|---|---|---|
| 3,603,139 | 9/1971 | Ying | 73/67.9 |
| 3,577,171 | 5/1971 | Turner | 73/67.5 R |
| 3,600,936 | 8/1971 | Turner | 73/67.9 |

Primary Examiner—Richard C. Queisser
Assistant Examiner—Arthur E. Korkosz
Attorney—Samuel L. Welt, Jon S. Saxe, Bernard S. Leon and Jacob Frank

[57] ABSTRACT

An ultrasonic transmitting apparatus for examination of a subject in a field comprising, a CRT transmitter having a transducer which is excited in a pattern to generate corresponding successive acoustic waves to scan the subject in "flying spot" type fashion, and a receiver for converting the subject reflected signals and providing a visual display.

7 Claims, 4 Drawing Figures

ULTRASONIC VISUALIZATION

BACKGROUND OF THE INVENTION

1. Field of the Invention

The present invention relates to techniques employing piezoelectric or other suitable materials for scanning a subject in a field with ultrasound and converting the acoustic image to electrical signals from which visual images may be formed.

2. DESCRIPTION of the Prior Art

Existing ultrasonic image converters, based on work by Sokoloff (see U.S. Pat. No. 2,164,125, issued June 27, 1939) are known, which basically operate by providing a transmitting transducer to generate a continuous or pulsed pressure wave that irradiates the whole field containing an object to be examined. The ultrasonic waves which pass through the object are modulated by voids or other irregularities and are then applied to one face of a piezoelectric plate which is normally incorporated into an electron tube structure such that the voltage or charge pattern on the inner surface of the faceplate may be "read" by a raster scanned electron beam. Although these existing visualization systems provide fair resolution at the faceplate, it has been found that such systems offer several drawbacks in that: the sensitivity is so low that extremely high and possibly unsafe levels of ultrasonic energy are required for most biological applications; no depth discrimination; and poor subject resolution is obtained so that the depth capability is limited due to signal to noise (S/N) problems.

With regard to the above, although at the present time little is known about ultrasonic toxicity, it is prudent to limit, for safety reasons, the ultrasonic power level which may be transmitted into a human subject. In utilizing safe ultrasonic power levels the tissue attenuation of ultrasound, particularly from structures deep in the body and at the higher frequencies required for good resolution, are such that the ultrasonic signal returned to the receiver will be very weak. In such prior art systems of the type described above, this returned weak signal is scanned with an electron beam which adds to the system a fraction of a volt of thermal noise, thus requiring undesirable ultrasonic power levels of the type described above to obtain satisfactory S/N ratio.

Further investigation for a suitable imaging system revealed that even an array of ultrasonic elements sequentially excited did not altogether prove to be suitable in that a small size piezoelectric transducer (i.e. 1/16 inch square) when excited, would radiate over a ninety degree (90°) angle, whereas if the same square area of a larger piezoelectric sheet were to be excited the radiation from that 1/16 inch square area would only radiate over approximately a ten degree angle. This significantly smaller beam provides for optimum transmitter power level utilization because of the availability of more practical lens configurations to focus the transmitted signal.

SUMMARY

The purpose of the present invention is to provide an ultrasonic visualization system and an electronic tube structure which allows for a sensitivity increase of several orders of magnitude over systems used in the prior art. The basic operation of the system covered by the present invention uses a piezoelectric faceplate as an electronically controlled source of ultrasound to scan the subject area in a manner analogous to an optical "flying spot" scanner. The shape and position of the excited pattern on the faceplate is controlled by electronic focusing and deflection of an electron beam pattern which is made to impinge on the inner surface of the faceplate, and radiate an acoustic wave at a relatively narrow angle through an ultrasonic coupling medium, into the subject under observation. Reflections from the subject are then derived and used to intensity modulate a CRT display which is scanned in synchronism with the transmitted "flying spot". By such an arrangement the CRT scan transmitter system may achieve good signal to noise ratio improvement by using high power density in the "flying spot", which, of course, would not be possible in the Sokoloff type systems where the transmitter irradiates the whole field continuously. In addition, utilization of a fixed receiver in the present invention, as opposed to the Sokoloff type electron tube receiver, allows for a sensitivity to signals down to the low micro-volt region, limited only by amplifier input noise.

Further objects of the invention call for imaging at selective depths within the subject under study to strongly enhance visualization of the body structure under study, and, in effect to fade-out the structures out-of-plane.

Other objects, advantages, and capabilities of the present invention will become apparent from the following description taken in conjunction with the accompanying drawings showing only preferred embodiments of the invention.

IN THE DRAWINGS

Figure 1:
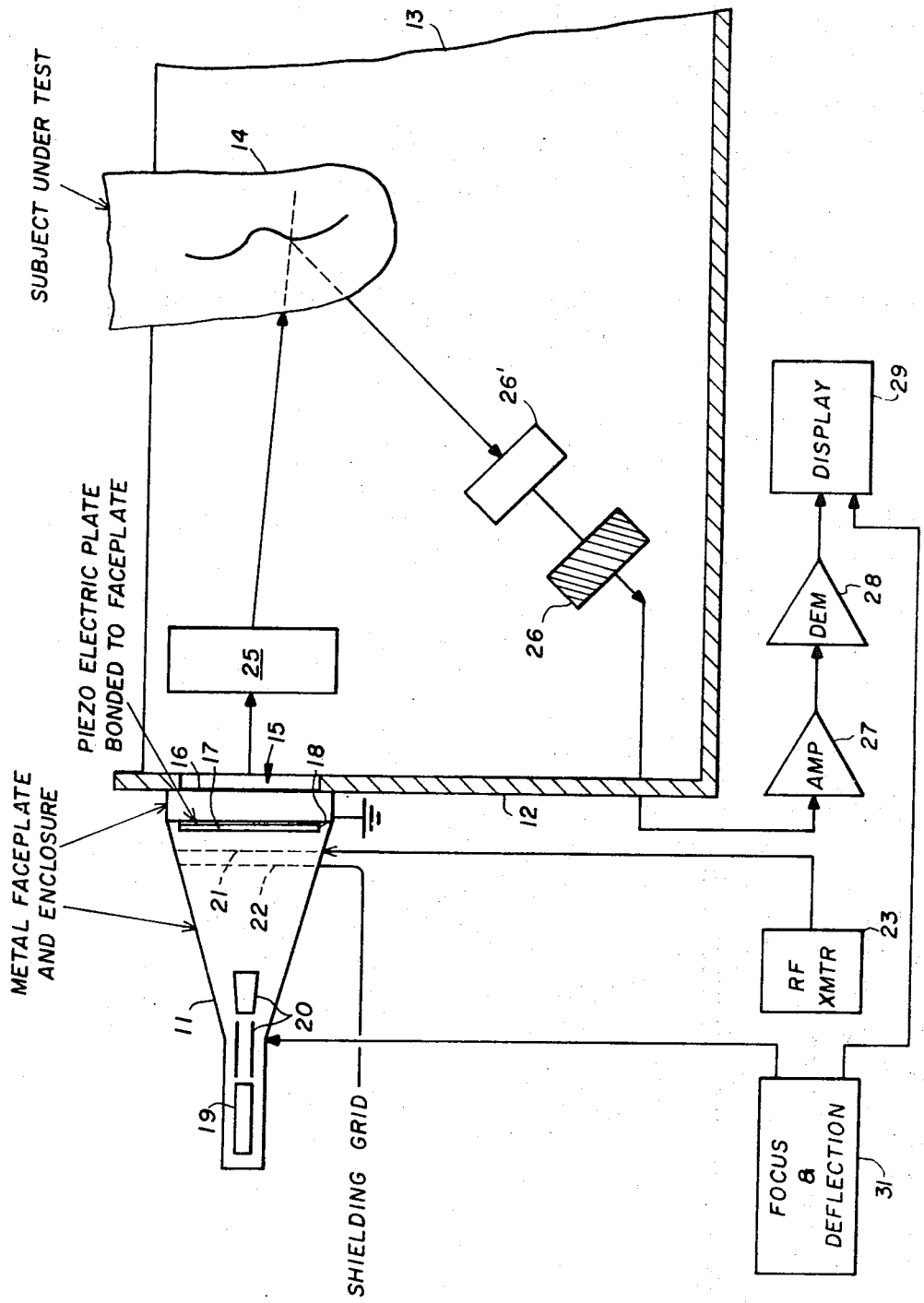
FIG. 1 is a block diagram of an illustrative overall system employing the principle of the invention.
Figure 2:
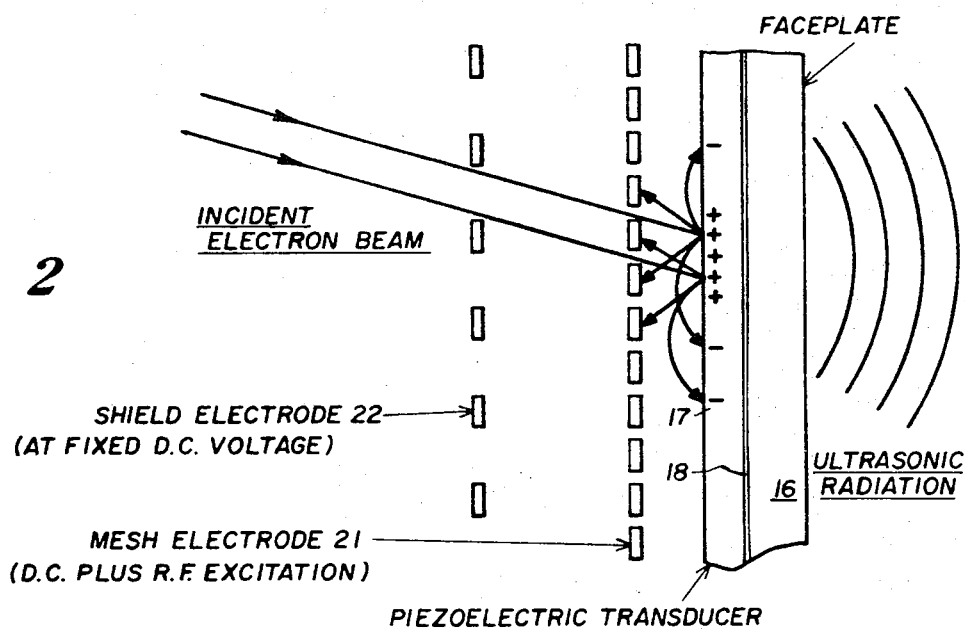
FIG. 2 is an enlarged partial view of the front end of electron tube 11 shown in FIG. 1.

Referring now to FIG. 1 of the drawings, there is shown an ultrasonic visualization system according to the invention, which includes an electron beam scanning tube 11 of the CRT type positioned against an immersion tank 12 containing an ultrasonic liquid coupling medium 13, such as water, in which the subject 14 under test, is immersed. The CRT is provided with a grounded front face 15 having contact with the coupling medium 13, and includes a support member or faceplate 16 fabricated from a suitable metallic shielding material such as brass.

The CRT is also provided with a piezoelectric transducer 17 having a metallized surface coating on one side. The transducer metallized side may be coupled to faceplate 16 by an member 18 which might comprise an adhesive that is also used in securing the piezoelectric member 17 to faceplate 16. Another coupling arrangement might include an oil with low vapor pressure for use in a vacuum as such an oil provides intimate contact with the transducer and faceplate surfaces to provide uniformity. Such a latter arrangement might contemplate a mechanical coupling of the transducer to the faceplate about the transducer periphery as by an O ring. The CRT 11 also comprises an electron scan gun 19 and suitable deflection means 20 to deflect the electron beam from the scan gun.

Further, included in the CRT is a collector "mesh" electrode 21 positioned close to and in front of the faceplate and a second shield electrode 22 at a fixed D.C. voltage located adjacent to mesh electrode 21. Mesh electrode 21 is directly coupled for energization from a suitable wavetrain or pulse generator 23

In the CRT, the incident electron beam energy is made proper to cause a relatively high secondary emission ratio. Since the piezoelectric target 17 is an insulator, its surface potential is floating and the electron illuminated portions will assume an equilibrium voltage close to that of mesh 21. If an RF voltage of the proper frequency is applied to mesh 21, the electron-illuminated portions of the piezoelectric target will "follow" the applied voltage to excite piezoelectric generation of ultrasound. In operation of the tube it is preferable that the potential on the backside of transducer 17 be kept fairly equal to the potential on the front surface, to improve the overall efficiency of the CRT. The second shield electrode 22 is used to prevent the alternating RF field from degrading the focus or deflection of the incident electron beam.

It has been found that if the thickness of the faceplate 16 is designated to approximately be an integral number of acoustic half-wave lengths of the RF modulation applied to grid 21, ultrasonic reflection may be kept quite low despite a large impedance mismatch between the faceplate 16 and coupling medium 13. Based upon this observation, for example, the brass support or faceplate 16 could be made a quarter inch thick with ten half wavelengths or an eighth of an inch thick with fire half wavelengths assuming use of 3.5 Hz operating frequency.

An ultrasonic lens 25 is mounted within the tank 12 for imaging a point on the surface of the piezoelectric faceplate to a point within the subject. Utilization of a lens system of this type allows for concentration or focus of the scanned "spot" to selected depths within the subject. Although the received ultrasonic signal will be a summation of reflections from both the organs at the focal plane and the organs at other depths in body, the effect of extraneous signals from outside the focal plane will be minimal since an out-of-focus beam will blur out the undesirable images on a display. A fixed receiving transducer 26 and lens 26' are placed at the same side of the subject as the transmitter, for focusing and receiving the subject reflected ultrasound.

Transmitting transducer 17 is directly coupled for energization from a suitable wave train or pulse generator 26 operating at the desired carrier frequency. Receiving transducer 25 is electrically connected to an amplifier 27, thence to an amplitude demodulator 28 the video output of which is connected to a display 29 such as a kinescope unit. Display 29 and CRT 11 are each connected to a common deflection unit 31 for synchronous scanning.

In operation, piezoelectric plate 16 is used as an electronically controlled source of ultrasonic radiation analogous to optical "flying spot" scanner, where the shape and position of the excited pattern on the faceplate is controlled by electronic focusing and deflection 31 of an electron beam pattern which is made to impinge on the inner surface of the piezoelectric target 17 enabling the electron illuminated portions to assume an equilibrium voltage close to that of the mesh 21 RF signal, to thus excite piezoelectric generation of ultrasound which is radiated in the form of a scanned "spot" through the brass faceplate 16, then through the liquid coupling medium 13. The scanned "spot" is then focused or concentrated to a point at a selected depth within the subject by imaging a point on the surface of the piezoelectric faceplate with lens 25. Tissue interfaces and structures within the subject 14 then reflect ultrasonic energy, in part, back toward the piezoelectric receiver 26 which may be omnidirectional, where the received signals are converted to a low level RF electrical signal. After amplification by amplifier 27, this signal is amplitude demodulated to provide a video output which is used to intensity modulate the CRT display 29 scanned in a synchronism with the transmitting "flying spot."

Figure 3:
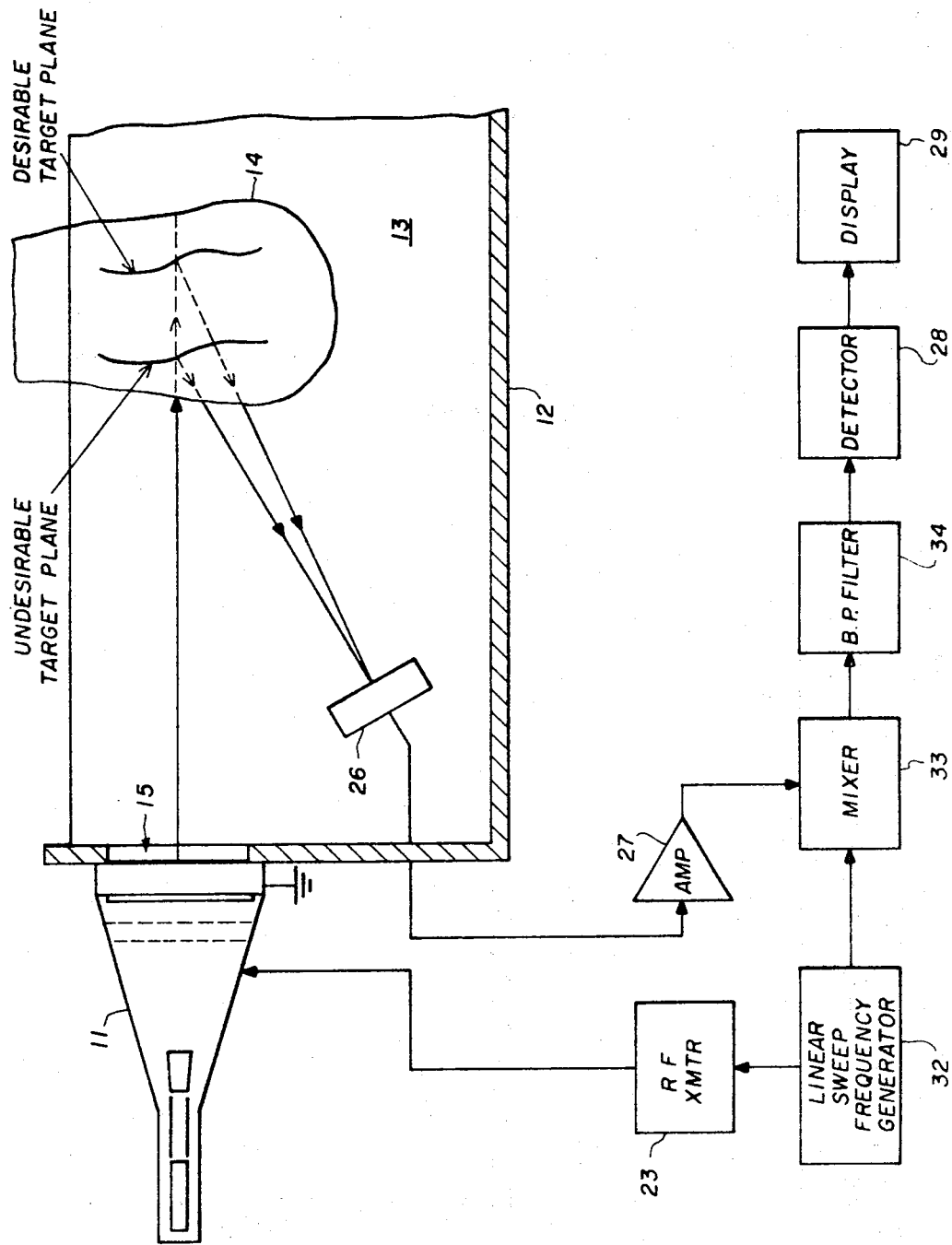
FIG. 3 is a block diagram of an alternate embodiment in using the invention.

An alternate method for enhancing the visualization of in-plane structures by electronically suppressing the returned signals from out-of-plane structures, is shown in FIG. 3, where a linear sweep frequency generator 32 modulates both the transmitted signal of RF transmitter 23 and a heterodyne local oscillator at the receiver, represented by mixer 33. This in effect will provide a resultant receiver I.F. frequency at the mixer output which will depend upon the differences between the instantaneous received ultrasonic frequency from the subject 14 at piezoelectric crystal 26 and the local oscillator frequency. This in turn will be dependent on propagation time delay and thus on range. Range selectively then may be achieved, with a bandpass filter 34 by bandpass filtering the I.F. signal. Of course, this alternate technique can only be used when other system parameters are such as to allow sufficient bandwidth.

Figure 4:
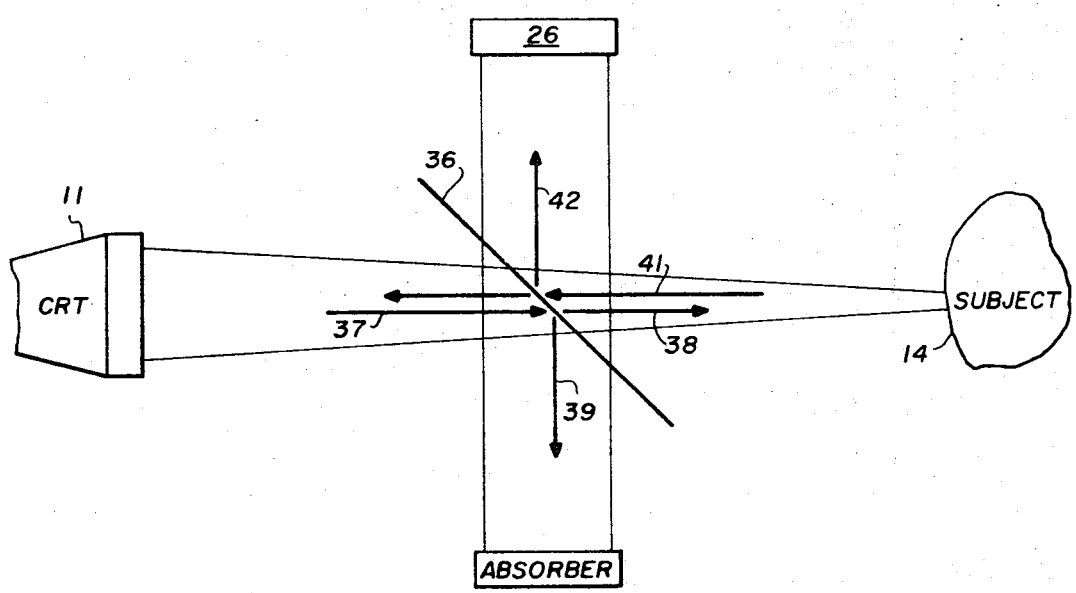
FIG. 4 is a schematic diagram illustrating the use of an ultrasonic "mirror" in combination with the present invention.

A modification for improving the operation of the present invention is illustrated in FIG. 4, where an ultrasonic "mirror" 36 fabricated from magnesium, brass, lucite or other suitable material and is preferably positioned at a 45° angle between CRT 11 and subject 14 allowing only, for example, about one half of the ultrasonic beam energy transmitted along path 37 to pass through along path 38 and penetrate the subject. The remaining half of the transmitted beam energy is reflected off "mirror" 36 via path 39 and dissipated at a suitable absorbing member 37 which may be comprised of Butyl rubber. The subject reflected ultrasonic energy is returned back toward the CRT along path 41 whereby about one half of this latter energy is reflected off "mirror" 36 and directed along path 42 to piezoelectric receiver 26.

The use of such a reflection system analogous to those employed in the optical area, provides for an optimum "picture" of that portion of the subject which it is desired to visualize. Should the available transmitter power exceed the desired operating level, then the "mirror" composition and/or thickness can be readily modified to reflect a larger percentage of the incident ultrasonic beam energy to keep the ultrasonic energy in the subject at the desired level and simultaneously decrease the loss of signal along path 42 to the receiver.

I claim:

1. Ultrasonic image converter apparatus for use in the medical diagnostic area for examination of a subject in a field comprising:
   CRT transmitter means having a piezoelectric faceplate, for radiating successive ones of ultrasonic energy waves adapted for scanning said field in "flying-spot" type fashion;
   receiver means distinct from said transmitting means, for providing electric signals indicative of the ultrasonic wave change in the field including a piezoelectric plate having a lead wire through which said electric signals are directly derived; and
   display means operated in synchronism with the CRT transmitter means and responsive to said electric signals for producing a visual representation.

2. Ultrasonic apparatus according to claim 1 where said CRT transmitter means includes:
   A piezoelectric target mounted on the faceplate,
   electronic beam means for applying an electrical change to successive ones of a plurality of spots on said target to radiate corresponding successive ones of a plurality of ultrasonic energy waves from said faceplate at a narrow angle of radiation allowing for a highly efficient transmission power utilization.

3. Ultrasonic apparatus according to claim 2 wherein:
   said receiver means includes detector means to provide video signals representative of the ultrasonic energy wave change in said field; and
   said display means being intensity modulated by said video signals for providing a visible pattern of a subject portion in the field.

4. Ultrasonic apparatus according to claim 1 including:
   linear sweep frequency generator means connected with said transmitter means for controlling the operating frequency of said ultrasonic energy wave:
   mixer means in said receiver means connected with said linear sweep frequency generator means for heterodyning said electrical signals:
   bandpass filter means in said receiver means connected from said mixer means; and
   detector means in said receiver means coupled from said bandpass filter means for providing video signals to said display means.

5. Ultrasonic apparatus according to claim 2 wherein:
   said field intermediate the CRT transmitting means and the subject is filled with a coupling medium, and
   said faceplate is fabricated of a faceplate is fabricated of an RF shielding material having an integral number of half wavelengths of said ultrasonic wave for matching said piezoelectric plate to said medium to achieve maximum acoustical transmission.

6. Ultrasonic apparatus according to claim 1 including: ultrasonic mirror means positioned in a path defined by said ultrasonic energy waves and adapted to direct ultrasonic energy waves reflected back along said path from said subject, to said receiver means.

7. An image conversion method for ultrasonic examination of a subject in a field for medical diagnostic purposes, which allows for receiving an improved signal/noise ratio at low ultrasonic energy transmitting levels comprising:
   employing a CRT transmitter having a piezoelectric faceplate for radiating successive ones of ultrasonic energy waves adapted to scan said field in a "flying-spot" type fashion;
   sensing, with a piezoelectric receiver spatially separated from the transmitter, an ultrasound energy wave change resulting from the presence of a subject in the field;
   deriving through a lead wire directly connected with the piezoelectric receiver, electrical signals indicative of said ultrasonic energy wave change; and
   displaying a visual representation of the subject scanned, in synchronism with the transmitter scan.

* * * * *